United States Patent [19]
White et al.

[11] Patent Number: 5,115,176
[45] Date of Patent: May 19, 1992

[54] CONTROL ARRANGEMENT FOR ELECTRICALLY PROPELLED WHEELED VEHICLES

[76] Inventors: Dewitt T. White, 12637 S. Barnes Rd., Byron, Mich. 48418; Thomas A. Plessinger, 1625 Killarney, Walled Lake, Mich. 48390

[21] Appl. No.: 600,663

[22] Filed: Oct. 22, 1990

[51] Int. Cl.[5] .............................................. H02P 3/00
[52] U.S. Cl. ........................... 318/362; 180/325; 318/383
[58] Field of Search ............... 318/254, 362, 364, 370, 318/372, 374, 383; 188/112 A, 112 R, 170, 105, 156, 110, 180; 414/921; 180/233, 244, 250, 325

[56] References Cited

U.S. PATENT DOCUMENTS

| | | | |
|---|---|---|---|
| 4,223,767 | 9/1980 | Powell | 188/112 A |
| 4,493,603 | 1/1985 | Williams et al. | 414/921 X |
| 4,726,601 | 2/1988 | Stevens | 188/112 R |
| 4,777,867 | 10/1988 | Jererinsson et al. | 188/170 X |
| 4,782,920 | 11/1988 | Gaibler et al. | 318/615 X |
| 4,813,518 | 3/1989 | Akiyama et al. | 188/170 |
| 4,856,850 | 8/1989 | Aichele et al. | 188/156 X |

Primary Examiner—William M. Shoop, Jr.
Assistant Examiner—A. Jonathan Wysocki
Attorney, Agent, or Firm—John R. Benefiel

[57] ABSTRACT

A control arrangement for protecting the control circuit for a self propelled, automatically controlled wheeled vehicle having spring applied, electrically released brakes, to enable the vehicle to be manually pushed without damage to the vehicle control circuitry by generation of currents by the DC motors, the arrangement including a manually operable switch disconnecting the DC drive motors from the vehicle control circuit while simultaneously energizing a brake release actuator.

6 Claims, 2 Drawing Sheets

5,115,176

CONTROL ARRANGEMENT FOR ELECTRICALLY PROPELLED WHEELED VEHICLES

BACKGROUND OF THE INVENTION

This invention concerns self propelled vehicles of the type in which electrical drive motors are powered by an on-board batteries and control to drive vehicle wheels, and particularly where sophisticated controls are used as in automatically guided vehicles (AGV's).

A well known type of such vehicle is guided along a path to cause the vehicle to follow a buried guide wire. Steering is accomplished by control circuitry associated with each of a pair of DC drive motors drivingly connected to a respective driven wheel on either side of the vehicle to vary the drive of each motor to carry out the necessary steering of the vehicle so as to follow the buried guide wire. Many other automatic guidance schemes have been employed.

These vehicles also commonly employ fail safe braking, in which wheel brakes are spring applied, and electrically released when the vehicle is underway by application of a voltage to a suitable brake hold out actuator.

In the event of a shutdown of the vehicle for some reason, the usual result is immobilization of the vehicle since the brakes are set.

Thus, removal of the vehicle requires that it be hauled away as by a fork lift truck. This requirement sometimes creates difficulties in that getting a suitable recovery vehicle may be impossible in tight quarters.

The present inventors have discovered a further difficulty in manually rolling the disabled vehicle out of the system; that is, the DC drive motors act as electrical generators even at very low speeds, and the slight electrical currents so generated result in severe damage to the control circuitry associated with the motors.

SUMMARY OF THE INVENTION

The present invention comprises a control arrangement and method for such vehicle which is able to be manually activated with a single switch. The arrangement involves a relay network which firstly applies power to the brake release actuator while at the same time isolating the brake apply circuit from the normal vehicle control circuitry to insure that no short circuiting or other interference occurs when the system powers the brake release actuator.

Simultaneously, the DC motor terminals are disconnected from their associated controls, so that any current generated by rotation of the motor armatures does not flow back into the motor controls.

When the switch is activated, the vehicle is then placed in a condition wherein it is able to be freely rolled out of the guidance path and/or towed by another vehicle when disabled and without danger of damaging the motor control circuitry.

DETAILED DESCRIPTION

In the following detailed description, certain specific terminology will be employed for the sake of clarity and a particular embodiment described in accordance with the requirements of 35 USC 112, but it is to be understood that the same is not intended to be limiting as the invention is capable of taking many forms and variations within the scope of the appended claims.

Figure 1:
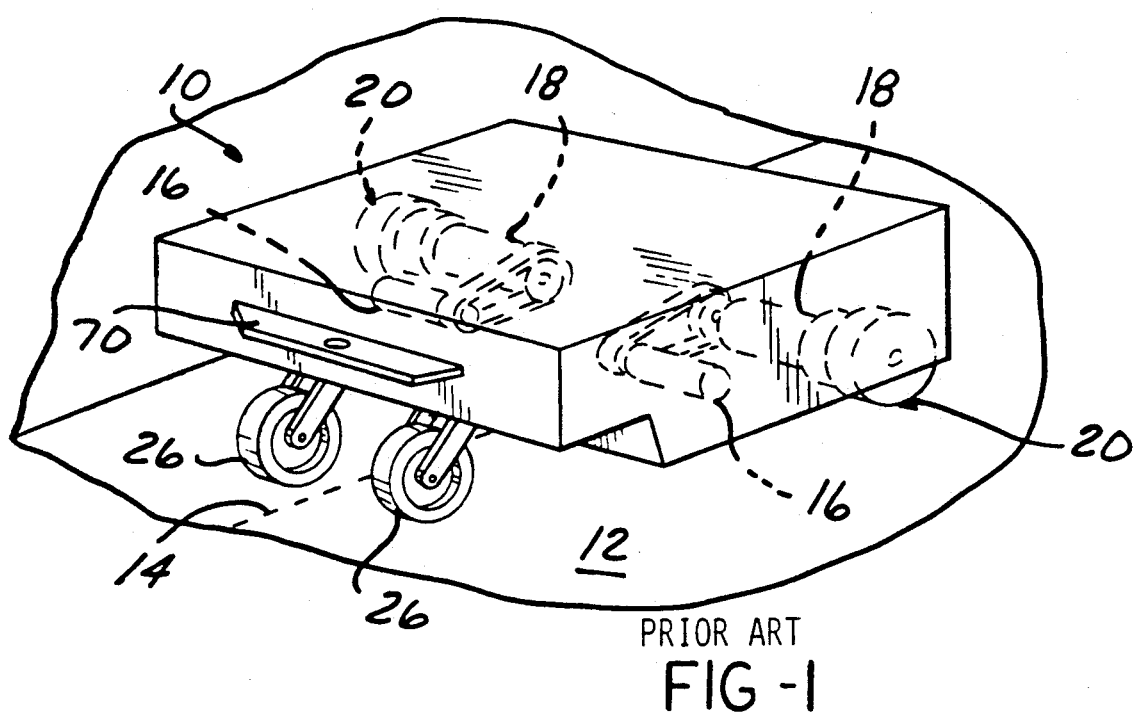
FIG. 1 is a perspective view of an automatic guided vehicle deployed on a surface having a guide path along which the vehicle is propelled.
Figure 2:
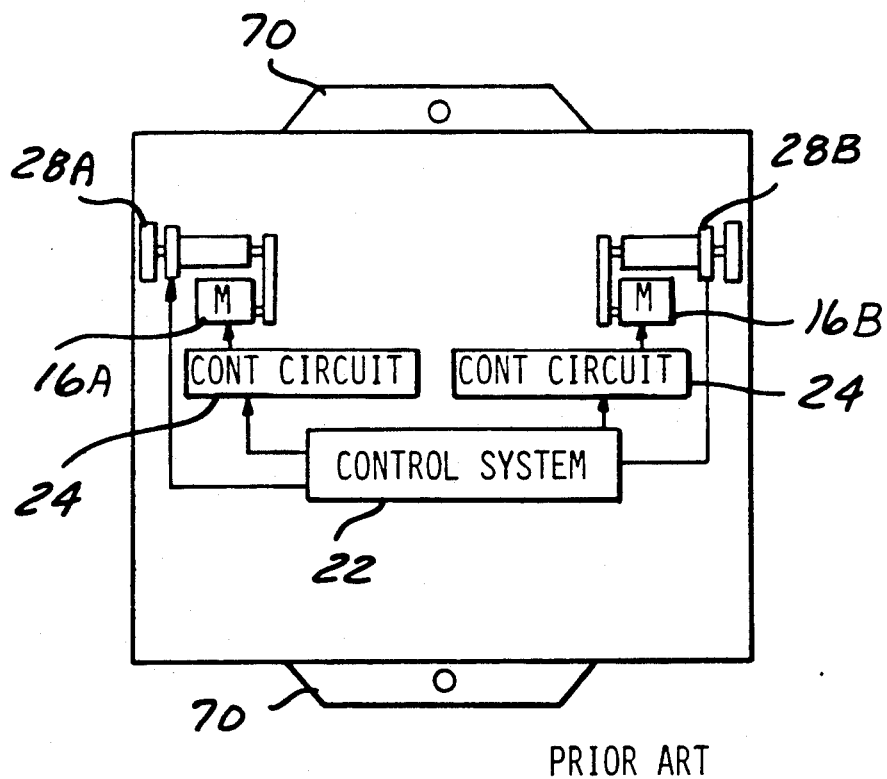
FIG. 2 is a schematic view of the main drive components of the vehicle of FIG. 1.

Referring to FIGS. 1 and 2, a self propelled automatically guided vehicle 10 is shown, often referred to as an "AGV", deployed on a surface 12 beneath which is buried a guide wire 14. The vehicle 10 is self propelled by a pair of DC motors 16A and 16B drivingly connected to drive units 18A, each associated with a respective powered wheel 20A or 20B on the left and right side at the rear of the vehicle 10.

An on board control system 22 involving radio signals broadcast from the buried guide wire 14 and received by a control system antenna which cause the drive motors 16A and 16B to be variably powered so as to keep the vehicle 10 centered on the guide wire 14.

Each motor 16 has an associated controller circuit 24 responding to commands from the control system 22.

Thus, the relatively closely spaced and pivoted forward caster wheels 26 accommodate steering by differential drive to the rear wheels 20A and 20B, and are maintained centered over the guide wire 14.

Spring applied, electrically released brakes 28A and 28B are also included associated with left and right rear wheels 20A, 20B. The brakes 28 are normally held disengaged by a signal from the control system 22 during travel of the vehicle, but engaged when the vehicle is stopped either normally or during an emergency switched stopped so as to immobilize the vehicle 10 when it is stopped.

Figure 3:
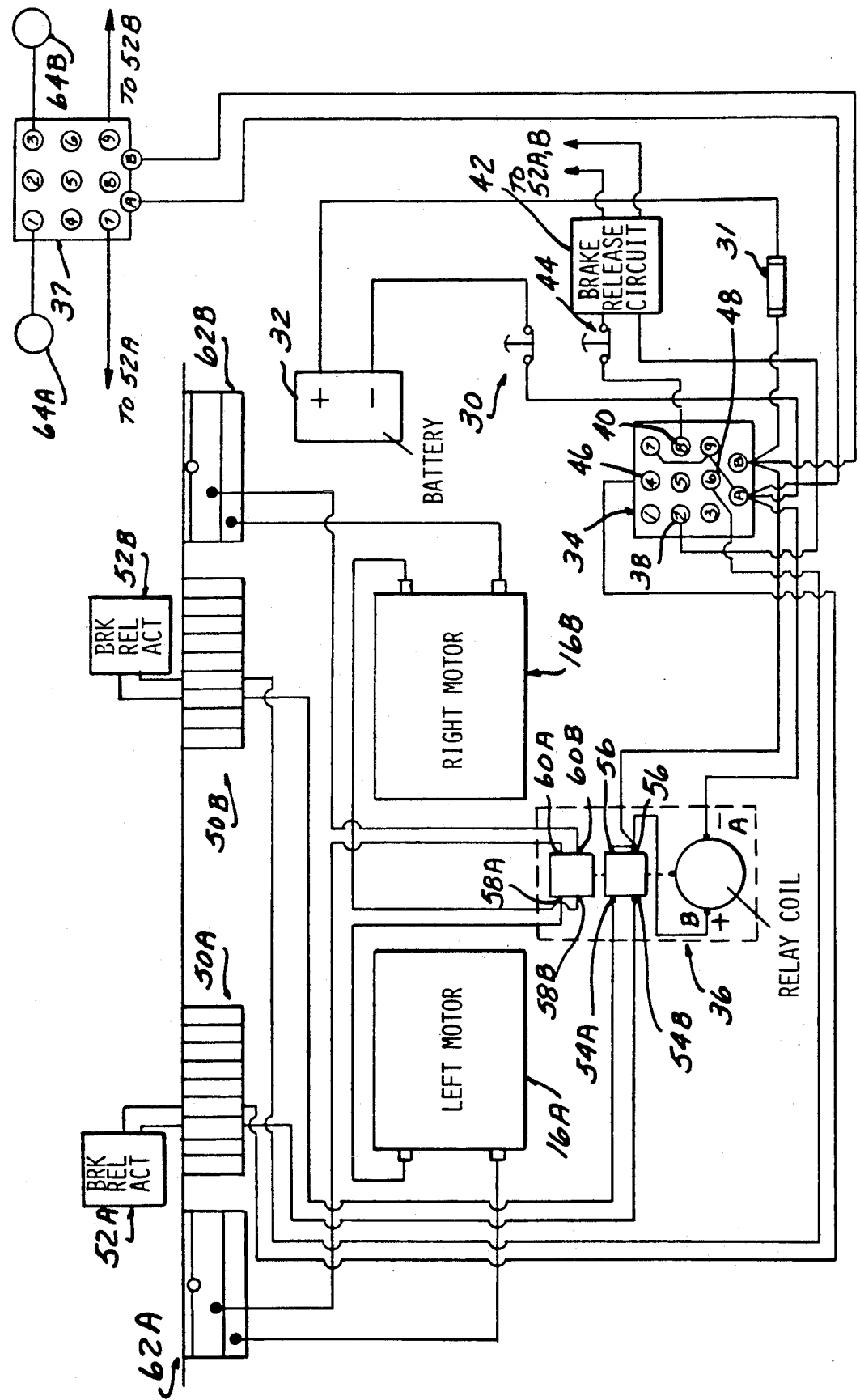
FIG. 3 is a circuit diagram of the control arrangement according to the present invention together with a block diagram representation of the associated vehicle components.

FIG. 3 reveals the details of the control arrangement according to the present invention, which includes a manually operable toggle switch 30A which selectively connects the negative polarity terminal of the on board battery 32 to an input of a first relay 34, second relay 36, and third relay 37. The positive terminal is directly connected via 5 amp fuse 31 to the other terminal B input of each of the first, second, and third relays 34, 36, 37.

The first relay 34 has a pair of normally closed contacts 38, 40 which are used to interrupt power to the brake release circuitry 42 when the first relay 34 is operated by the isolated toggle switch 30.

The conventional emergency stop switch 44 also acts to disconnect power to the brake release circuitry 42 to cause immobilization of the vehicle 10. By routing the power to the brake release circuitry through normally closed contracts 38, 40 of relay 34, this power is interrupted when the relay is operated. This arrangement prevents possible short circuiting which could occur by simultaneously applying power to the brakes via the present system and the brake release circuitry 42.

Positive voltage is applied via normally open contacts 46 and 48 of the first relay 34 to terminal strip 50A, 50B providing connecting to the brake release actuators 52A, 52B respectively.

The second relay 36 has a first set of normally open contacts 54A and 54B connecting negative voltage applied via opposite contacts 56 to the terminal strips 50A, 50B respectively to complete the application of power to the brake release actuators 52A, 52B when both relays 34, 36 are pulled in by operation of the isolation toggle switch 30.

A second set of normally closed contacts 58A, B and 60A, B are interposed in the circuit leads from the motor control cards 62A, 62B respectively to the drive motor 16A, 16B respectively.

Thus, when the second relay 36 is pulled, the drive motors 16A, 16B are electrically disconnected from their control circuitry to prevent damage resulting from currents generated during manual rolling of the vehicles 10.

If current surge suppressors 64A, 64B are employed to protect the brake release actuators from spikes caused by rapid cycling, a third relay 37 may be incorporated for electrically disconnecting these suppressors 64A, 64B normally connected to the brake release actuators 52A, 52B via normally closed contacts, 1, 7 and 3,9. When voltage is applied to terminals A, B, the contacts 1,7 and 3,9 are opened to disconnect the suppressors 64A, 64B from the circuit.

A towing bracket 70 may be affixed to the front or rear of the vehicle 10 for towing by another vehicle.

Thus, a simple arrangement has been provided for alleviating a significant problem in the use of electrically self propelled vehicles, in that by operation of a single manual switch, the brakes are held released and the motors electrically isolated to enable a vehicle to be freely moved by pushing the same out of the guidance path.

We claim:

1. A control arrangement in combination with a self propelled automatically guided wheeled vehicle including at least one electrical motor coupled to drive one or more wheels of said vehicle to establish a propelling drive of said vehicle, control circuit connected to said electrical motor for energizing or denergizing said motor incidental to controlling the propelling drive of said vehicle by the drive of said wheels by said electrical motor, and also including spring applied brakes for said wheels of said vehicle, electrical actuator release means for releasing said brakes, the improvement comprising, a control arrangement including a manually operable control circuit isolation switch; disconnect means for electrically disconnecting said control circuit from said at least one electrical motor in response to operation of said switch to electrically isolate said control circuit from said at least one electrical motor; and means for supplying power to said electrical actuator release means for said releasing said brakes simultaneously with disconnection of said at least one electrical motor and said control circuit upon operation of said circuit isolation switch.

2. The combination of claim 1 wherein a pair of electrical drive motors are arranged to drive a respective wheel of said vehicle and wherein said control circuit is operatively connected to each drive motor to control energization and denergization thereof, and wherein said disconnect means causes each motor to be disconnected from said control circuit upon operation of said isolation switch.

3. The combination of claim 1 wherein said disconnect means includes relay means operated by said switch.

4. The combination of claim 1 wherein said vehicle includes a brake release control circuit for normally powering said brake release actuator, and wherein said disconnect means includes means disconnecting said brake release control circuit from any source of power simultaneously with directly supplying power to said brake actuator release means by operation of said isolation switch.

5. A method of selectively controlling self propelled, automatically controlled wheeled vehicles of the type including electrical DC drive motor means associated with wheels of the vehicles to propel said vehicle, a vehicle control circuit associated with the DC drive motor means controlling energization and denergization thereof, and electrically released brakes associated with wheels of the vehicle operated by said vehicle control circuit, the method including the steps of providing a mannually operable switch and electrically isolating and disconnecting the electrical DC drive motor means from the control circuit by operation of the switch so as to electrically isolate the DC drive motor means from the control circuit to protect said control circuit from electrical current generated by said DC drive motor means, and simultaneously applying power to the brakes to release the same.

6. The method according to claim 5 further including the step of electrically disconnecting the brakes from the vehicle control circuit upon applying power to the brakes.

* * * * *